United States Patent
Fuller

[11] 3,739,534
[45] June 19, 1973

[54] METHOD OF PRODUCING TORIC LENS ELEMENTS WITH ASPHERIC SURFACES

[75] Inventor: David L. Fuller, Atlanta, Ga.
[73] Assignee: Scripto, Inc., Atlanta, Ga.
[22] Filed: Oct. 8, 1971
[21] Appl. No.: 187,605

[52] U.S. Cl. .................................. 51/284, 51/67
[51] Int. Cl. ............................................ B24b 13/02
[58] Field of Search .............................. 51/284, 67

[56] References Cited
UNITED STATES PATENTS
2,703,470   3/1955   Porter ................................ 51/67 X

*Primary Examiner*—Donald G. Kelly
*Attorney*—Edward Taylor Newton, George M. Hopkins and William J. Ormsby

[57] ABSTRACT

A toric lens element is provided with an aspheric surface by first generating a cylindrical surface of revolution on a body of optical material and then honing this surface to aspherize it. While the work is being rotated about the axis of the cylinder, a honing member having a cutting surface of fixed radius is reciprocated back and forth along a path contained within a plane passing symmetrically through the work at an angle to the cylindrical axis. By controlling the curvature of the honing surface and the angle of honing, an aspheric surface is generated which approximates a fourth order sag plot effect. The particular relation is one in which the honing surface is formed with a radius of curvature which is equal to $1/R_I \cos^2\phi + 1/R_T \sin^2\phi$; where $R_I$ is the instantaneous radius of curvature of the ellipse defined by the intersection of the cylindrical work surface and the plane in which the hone is reciprocated at that point of the ellipse at which the ellipse is intersected by its minor axis, $R_T$ is the radius of the cylindrical surface, $\phi$ is equal to 90° minus the angle of the plane, $R_L = R_I \cos^2\phi + R_T \sin^2\phi$ with respect to the axis of rotation, and $R_L$ is the radius of the honing surface.

5 Claims, 2 Drawing Figures

PATENTED JUN 19 1973

3,739,534

INVENTOR:
DAVID L. FULLER
BY: *Newton, Hopkins, & Ormsby*
ATTORNEYS

METHOD OF PRODUCING TORIC LENS ELEMENTS WITH ASPHERIC SURFACES

BACKGROUND OF THE INVENTION

In my prior U.S. Pat. Nos. 3,251,266 and 3,361,512, wide angle photographic objectives are disclosed which employ toric lens elements and in my copending application Ser. No. 94,830, filed Dec. 3, 1970 a wide angle photographic lens system is disclosed in which a toric lens element having an aspheric surface in one plane is employed materially to increase the performance of the system.

The performance increase obtained by the use of aspheric surfaces on toric lens elements would ordinarily be justified only in unusual circumstances since the cost involved in forming or generating the aspheric surface by known methods is quite high. If, however, a low cost method of generating such aspheric surfaces were available, optical performance of systems such as are described above could be enhanced materially at little or no additional cost.

BRIEF SUMMARY OF THE INVENTION

The present invention is directed to the method of making toric lens elements provided with aspheric surfaces.

Basically, the invention involves the generation of a surface of revolution on a body of optical material and then altering this surface in such fashion as to aspherize it. Specifically, the surface may be altered according to this invention so as to approximate a fourth order sag effect very closely. By "fourth order sag" is meant a surface having deformation or sag of the form $R+By^4$, where $R$ is a constant, $B$ is a constant and $y$ is the height or distance from the vertex of the surface taken normal to the optical axis.

The alteration of the surface is achieved by reciprocating a honing surface back and forth along a path contained in a plane which intersects the axis of the surface, the blank being rotated about this axis and the honing surface having a constant or fixed radius of curvature. A radial line from the point of intersection between the plane and the axis passes through the vertex of the aspheric surface and the stroke of the honing surface is adjusted such that its mid point is at such vertex.

BRIEF DESCRIPTION OF THE DRAWING FIGURES

FIG. 1 is an elevational view illustrating apparatus for performing an aspherizing operation; and FIG. 2 is a top plan view of the apparatus shown in FIG. 1.

DETAILED DESCRIPTION OF THE INVENTION

Figure 1:
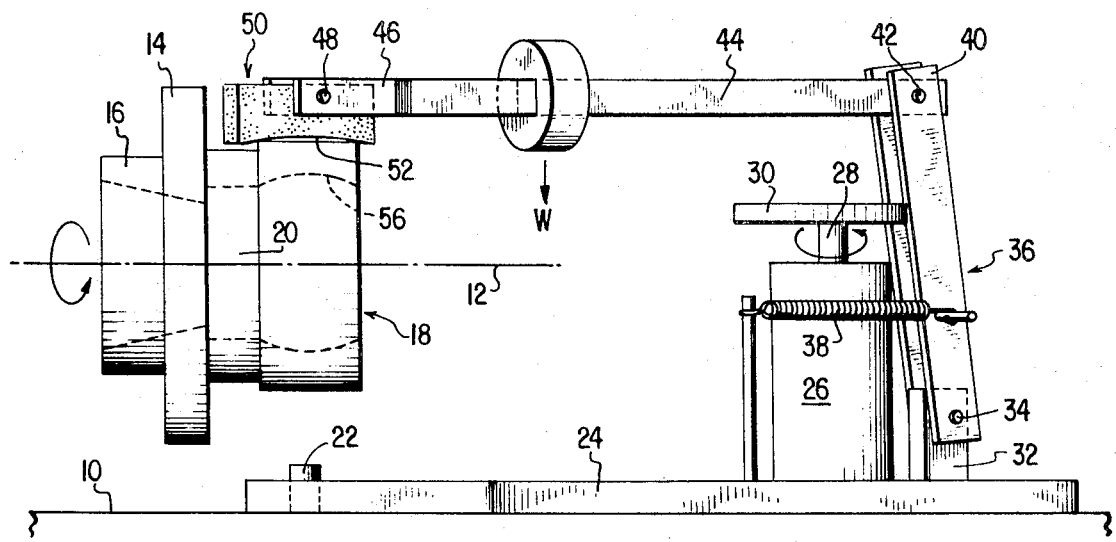

In the arrangement shown in FIG. 1, the base or frame of the machine is indicated by the reference character 10 and mounted on this frame is a suitable bearing support and a spindle supported thereby for rotary motion about the axis 12, the spindle and its associated bearing support not being illustrated in FIG. 1. It is to be understood that a conventional drive for imparting the rotary motion to the spindle is also provided. Mounted on the spindle is a suitable face plate 14 whose hub 16 is rigidly affixed to the end of the spindle so that the entire face plate rotates therewith, as is conventional in many machines such as lathes and the like. A body of optical material indicated generally by the refernce character 18 is affixed by adhesive material to a mandrel member 20 which is, in turn, affixed to the face plate 14 in the manner shown.

The bed or frame 10 is provided with a pivot post 22 which pivotally mounts the carrier plate 24 upon which is mounted a motor 26 having a shaft 28 provided with an eccentric or cam 30 thereon. The plate 24 carries the upright 32 which is pivotally secured by means of a suitable pivot pin 34 to the lower end of the yoke assembly 36 and a spring 38 connected between the yoke 36 and an upright 40 on the plate 24 constantly urges the yoke into engagement with the eccentric or cam 30 whereby the yoke oscillates as the eccentric 30 is turned by the motor 26.

Figure 2:
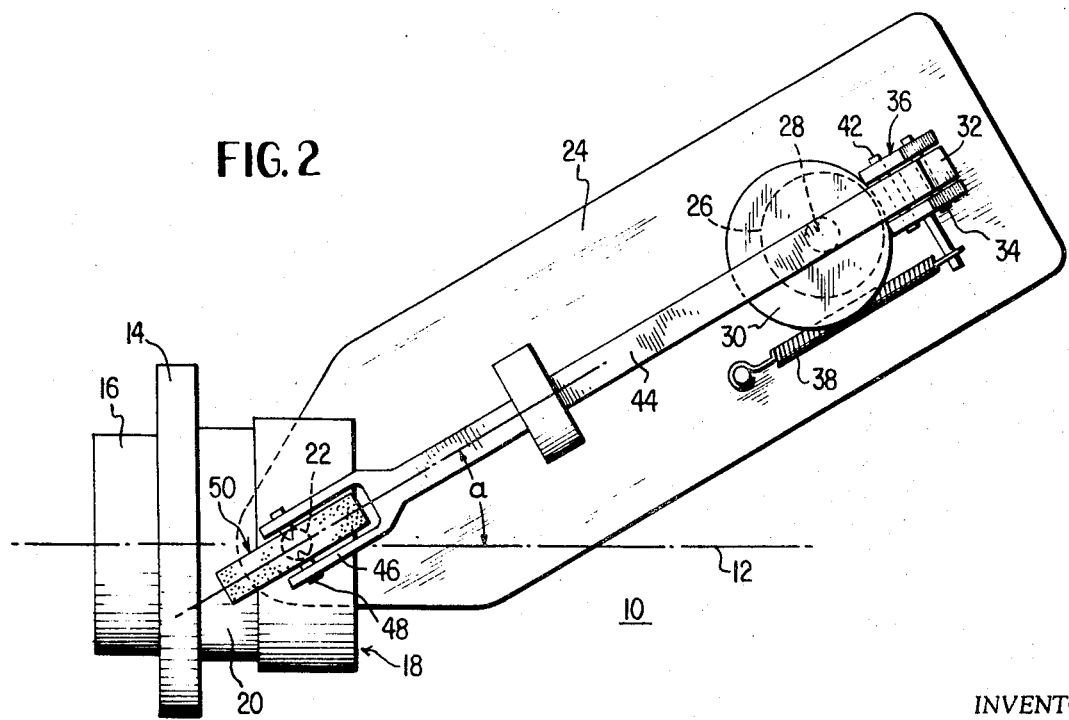

The upper end of the yoke 36 is bifurcated at 40 and carries a pivot pin 42 by means of which the transfer arm 44 is pivotally connected to the upper end of the yoke. The transfer arm projects beyond the yoke and is bifurcated at its end 46 and carries a pivot pin 48 for carrying the honing stone 50. The plate 24 is provided with any suitable hold down bolts or the like by means of which the plate is pivotally adjusted about the post 22 so as to assume the desired angle $a$ with respect to the spindle center line 12 as is indicated in FIG. 2. As hereinafter more particularly described, the honing surface 52 of the stone 50 is formed of a specific radius of curvature and, as will be manifest from FIG. 2, the honing stone is reciprocated back and forth along a path contained within that vertical plane which intersects the vertical plane containing the axis 12 of the spindle and the axis of the post 22 and which plane makes the aforesaid andle $a$ therewith.

It will be appreciated that the honing assembly could be mounted on the carriage of a lathe but for the purpose of clearly illustrating the relative positioning of the components involved, the plate 24 and related pivot post 22 have been shown in the drawing.

In the embodiment of the lens blank element shown, the outer surface 54 of the optical material 18 is cylindrical surace of revolution whereas the inner surface indicated by the reference character 56 has a concave curvature of uniform radius in a plane containing the axis of the blank. These surfaces are preliminarily prepared in a manner hereinafter set forth.

The plate 24 is set or fixed with respect to the base and the surface 52 of the lapping stone is accurately formed to a fixed or constant radius and is reciprocated in a plane which intersects the cylindrical surface 54 making an angle $a$ with respect to the spindle center line 12. The honing stone has a length slightly greater than the width of the path across the blank 18 and the stroke of the transfer arm 44 is adjusted to be ± one-fourth the width across the path as described. Moreover, the stroke of the transfer arm 44 is adjusted so that it extends equidistantly on opposite sides of the axis of the post 22 so as to be aligned properly with respect to the inner surface 56 of the blank whereby the vertex of the aspherized outer surface is in a plane normal to the axis of rotation and containing the vertex of the inner surface.

With this arrangement prevailing, the honing stone will alter the surface along the path width to a circular curvature of radius equal to that of the honing surface. Under proper circumstances, this alteration may be made very closely to approximate a fourth order effect, the amount of deformation being a function of the angle at which the lap is set, the radius of curvature of the honing surface, and the radius of the circle defined by the vertex of the aspherized surface (toric radius). As a specific example, to generate the surface for the FIG. 2 radius of the lens 10 in my aforesaid copending application where $R=401.478$ and $B=-2.592\times10^{-6}$, the honing path was set at an angle $a$ of 77.725°; the lap radius $R_L$ was 79.5607mm; the instantaneous radius of curvature $R_I$ was +305.934mm; and $R_T$ was 76.86808mm.

In order to form the blank 18 of FIGS. 1 and 2, a slab of optical glass is affixed to a suitably shaped mandrel 20 preferably by means of an epoxy cement and then generally cylindrical inner and outer surfaces are first formed by securely clamping the assembly to the bed of a drill press and cutting the cylindrical annulus by means of cylindrical cutting tools, one for the inner surface and one for the outer surface. Each tool takes the form simply of a tube provided with a suitable mandrel for engaging within a chuck of a drill press and with a squared end edge. The end edge of the tool is brought into contact with the flat face of the glass slab and a slurry of 120 silicon carbide and water is continuously or intermittently introduced between the cutting tool and the glass.

When the rough cylindrical annulus has been thus formed, the blank and its mandrel 20 may be cemented to the face plate 14, again by a suitable epoxy cement and the whole assembly mounted on a suitable lathe whereafter the cylindrical surface 54 is trued as by a diamond cutting tool. Then the rough contour of the inner surface 56 is formed by a diamond wheel operating in conjunction with a tracer attachment mounted to the lathe carriage as solidly as possible. The rough grinding operations take place in the presence of a continuous flooding with coolant solution which preferably is a mixture of 5 gallons of water and one cup of sal soda.

After the rough grinding operations of the aforesaid, surface honing is effected for the outer surface as described hereinabove and then the inner surface is honed whereafter both surfaces are ready for polishing. The honing operations are, in general, performed along the lines which have been developed previously in conjunction with precision machining of bearing raceways, excepting the specific aspherizing honing described hereinabove which departs therefrom in the manner specified. The honing is carried out using suitable honing sticks and abrasive grit in grades 400, 600, 800 and 1,000, sequentially in that order whereafter the surfaces are ready for polishing.

The polishing operation proceeds along the lines of the honing except that a polishing lap is prepared by first coating the lap support with a medium soft pitch and then coating this pitch with beeswax. Whereafter, the lap is warmed in hot water and while still pliable is pushed into the surface of the workpiece which has been coated with a mixture of polishing compound and water and the operation thereafter is similar to the honing operation.

It should be obvious that the surface of revoltuion generated on the blank need not be cylindrical, although calculation with respect to a cylindrical surface are required in order to obtain the value of $R_I$. For practical reasons, however, the generated surface is best formed as a cylinder in order to assure a more practical and efficient honing operation.

What is claimed is:

1. The method of making a toric lens element having an aspheric surface, which comprises the steps of:
   a. shaping a body of optical material into a blank having at least one surface of revolution;
   b. forming a honing member having a honing surface of selected radius of curvature;
   c. rotating said blank about the axis of revolution; and, during step (c),
   d. aspherizing said one surface by engaging said honing surface against said surface of revolution and effecting relative reciprocation therebetween back and forth along a path contained in a plane passing through said blank and intersecting said axis at a selected angle.

2. The method of making a toric lens element having an aspheric surface, which comprises the steps of:
   a. shaping a body of optical material into an annular blank having concentric inner and outer surfaces;
   b. forming a honing member having a curved honing surface of constant radius;
   c. rotating said blank about the common axis of said concentric surfaces; and, during step (c),
   d. engaging said honing surface against one of said surfaces and effecting relative reciprocation therebetween back and forth along a path contained in a plane passing through said blank and intersecitng said common axis at a selected angle.

3. The method of making a toric lens element having an aspheric surface, which comprises the steps of:
   a. shaping a body of optical material into an annular blank having concentric inner and outer cylindrical surfaces;
   b. forming a honing member having a convex honing surface;
   c. rotating said blank about the common axis of said cylindrical surfaces; and, during step (c),
   d. engaging said honing surface against said inner cylindrical surface and effecting relative reciprocation therebetween back and forth along a path contained in a plane passing through said blank and intersecting said common axis at a selected angle.

4. The method according to claim 2 wherein said plane intersects said blank along a plane of symmetry thereof, said plane and said outer surface defining an elliptical curve having a selected instantaneous radius of curvature at the point of intersection between said curve and its minor axis, and said honing surface being formed to said selected instantaneous radius of curvature.

5. The method according to claim 3 wherein said plane intersects said blank along a plane of symmetry thereof, said plane and said inner surface defining an elliptical curve having a selected instantaneous radius of curvature at the point of intersection between said curve and its minor axis, and said honing surface being formed to said selected instantaneous radius of curvature.

* * * * *